United States Patent [19]

Peterson

[11] Patent Number: 4,793,757
[45] Date of Patent: Dec. 27, 1988

[54] FINISHING WASHER

[75] Inventor: Francis C. Peterson, Woodbury, Conn.

[73] Assignee: Buell Industries, Inc., Waterbury, Conn.

[21] Appl. No.: 49,944

[22] Filed: May 15, 1987

[51] Int. Cl.⁴ ............................................. F16B 43/00
[52] U.S. Cl. .................................. 411/533; 411/353; 411/544; 411/546
[58] Field of Search ............... 411/544, 533, 546, 352, 411/353, 112, 103, 105, 107, 999

[56] References Cited

U.S. PATENT DOCUMENTS

| | | | |
|---|---|---|---|
| 1,487,610 | 3/1924 | Schatzel | 411/533 |
| 1,865,132 | 6/1932 | Olson | 411/161 X |
| 2,746,506 | 5/1956 | Poupitch | 411/134 |
| 3,414,154 | 12/1968 | Rose et al. | 411/999 X |
| 3,561,792 | 2/1971 | Cycowicz | 411/544 X |
| 3,673,911 | 7/1972 | Ramillon | 411/533 |
| 4,188,459 | 2/1980 | Hyner et al. | 411/902 X |
| 4,241,491 | 12/1980 | Hopp | 411/533 X |
| 4,435,112 | 3/1984 | Becker | 411/546 X |
| 4,645,393 | 2/1987 | Pletcher | 411/533 X |
| 4,682,686 | 7/1987 | Ueda et al. | 411/546 X |

FOREIGN PATENT DOCUMENTS 0140780 3/1980 German Democratic Rep. ............................ 411/902

Primary Examiner—Lloyd A. Gall
Attorney, Agent, or Firm—St. Onge Steward Johnson & Reens

[57] ABSTRACT

A finishing washer 10 is presented. Finishing washer 10 comprises a frustoconical perforated disk 15 having a plurality of tabs 20 extending inward from disk 15. When applied to a screw 50, finishing washer 10 provides a wider bearing area to the screw head 52, to establish a wear point between screw 50 and the material finishing washer 10 will bear on. In this manner, the material is not damaged by friction or pressure when screw 50 is tightened. Further, stripping of screws is lessened due to the use of finishing washer 10 of this invention.

9 Claims, 1 Drawing Sheet

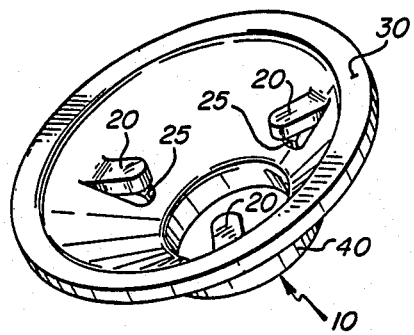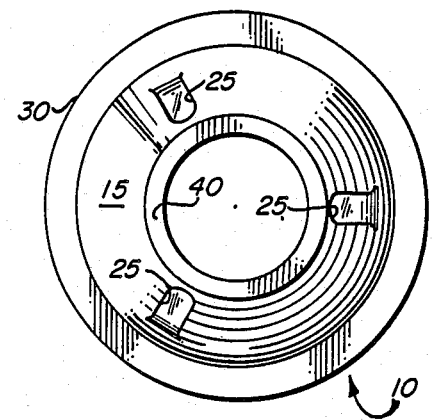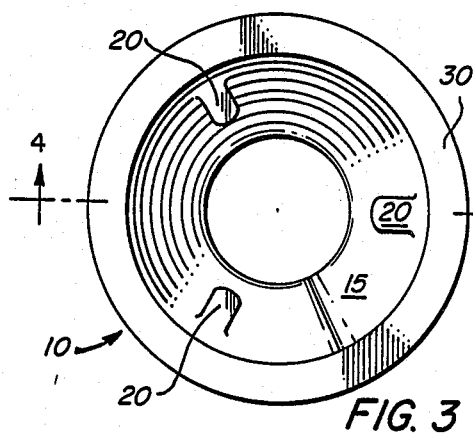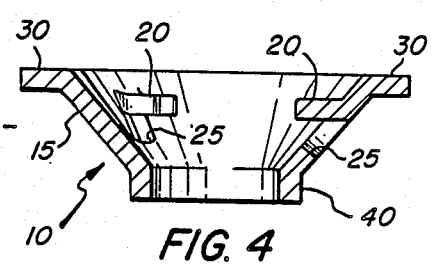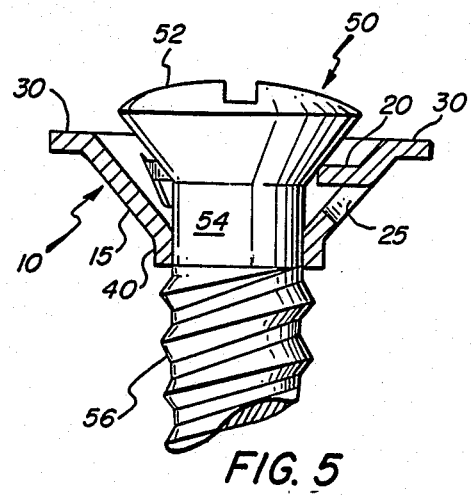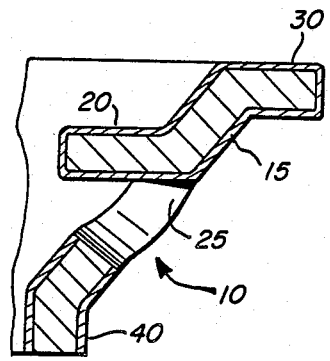

FINISHING WASHER

TECHNICAL FIELD

The present invention is related to a finishing washer. More particularly, the present invention is related to a finishing washer comprising a frustoconical perforated disk having a plurality of tabs extending inward from the disk.

The use of screws to attach one material to another has been known for years. Although often the preferred means of attachment, the use of screws leads to several disadvantageous conditions. For instance, when softer materials are used, such as plastic or carpeting used by the auto industry, the friction or pressure when the screw is tightened can often damage the materials being attched. Also, when more rigid materials, such as metals, are being attached, over-tightening of the screw can often lead to stripping.

To overcome these disadvantages, finishing washers were developed. A finishing washer is a washer disposed on a screw between the screw head and the uppermost threads. Finishing washers provide a wider bearing area to the screw head and a wear point between the screw and the material the washer will bear on.

Unfortunately, friction between the head of the screw and the washer can be greater than friction between the washer and the material the washer will bear on, causing the finishing washer to spin with the head of the screw. Further, when parts are painted, the finishing washer can become glued to the head of the screw, preventing the finishing washer from spinning freely, which is required for proper operability of the finishing washer.

DISCLOSURE OF INVENTION

Accordingly, the present invention provides a finishing washer which does not exhibit the disadvantages described and provides a wide bearing area and wear point to the screw on which the finishing washer is disposed. The finishing washer of this invention comprises a frustoconical perforated disk having a plurality of tabs extending inward from the disk.

BRIEF DESCRIPTION OF DRAWINGS

The present invention will be better understood and its advantages more apparent in view of the following detailed description, especially when read with reference to the appended drawings, wherein:

FIG. 1 is a top perspective view of the finishing washer of the present invention;

FIG. 2 is a bottom plan view of the finishing washer of the present invention;

FIG. 3 is a top plan view of the finishing washer of the present invention;

FIG. 4 is a side plan view in cross-section of the finishing washer of the present invention;

FIG. 5 is a side plan view in partial cross-section of the finishing washer of the present invention disposed on a screw; and FIG. 6 is a side cut-away view in cross-section of the finishing washer of the present invention.

BEST MODE FOR CARRYING OUT THE INVENTION

The present invention relates to a finishing washer 10 comprising a frustoconical perforated disk 15 having a plurality of tabs 20 extending inward from disk 15. As used herein, the terms "up", "down", "upper", "lower", etc. refer to finishing washer 10 of this invention in the orientation illustrated in FIG. 4. It will be understood that finishing washer 10 may assume different orientations when in use. Further, as used herein, the terms "inward", "outward", etc. refer, respectively, to the central and external areas of frustoconical disk 15.

As noted above, finishing washer 10 of this invention comprises a frustoconical perforated disk 15. By frustoconical perforated disk is meant a disk having a center perforation and shaped in the form of the frustum of a cone, i.e., the section between the base of a cone and a plane parallel to it, having an opening at each end. Advantageously, frustoconical perforated disk 15 may be formed of any suitable rigid or semi-rigid material, such as iron, aluminum, nickel, zinc, copper, brass, steel, and alloys thereof. Most preferably, it is formed of steel. Further, disk 15 can have a suitable finish, such as nickel, zinc or an alloy thereof, to provide desired aesthetic or functional characteristics, as would be known to the skilled artisan.

Typically, disk 15 is copper plated as illustrated in FIG. 6 by means of a barrel plater. An advantage of tabs 20 is to prevent nesting of disks 15 when plated in bulk, which would lead to incomplete plating and permit finishing washer 10 to take on carbon in plating, and become brittle.

In forming frustoconical perforated disk 15 of this invention, it is often advantageous to form the uppermost portion of disk 15 so as to be horizontal to allow it to sit against the head 52 of the screw 50, and the lowermost portion of disk 15 to be vertical so as to allow it to sit against the screw-rod 54, so that the presence of finishing washer 10 does not interfere with the intended operation of screw 50 and also so that finishing washer 10 spins freely, as will be explained in more detail below.

As illustrated in FIGS. 1 and 3-6, finishing washer 10 of this invention compries a plurality of tabs 20 extending inward from frustoconical perforated disk 15. These tabs 20 are generally configured as relatively small fingers formed of the same material as frustoconical perforated disk 15 and serve to prevent the internal sides of finishing washer 10 from sitting against or directly contacting the sides of head 52 of screw 50, to allow finishing washer 10 to remain free-spinning. In a preferred embodiment of this invention, tabs 20 are formed by lancing them out of the sides of frustoconical perforated disk 15, i.e., by punching them out using a suitable hole-punching or lancing device, thereby leaving openings 25 remaining in the side of frustoconical perforated disk 15.

Advantageously, as illustrated in FIG. 6, when tabs 20 are formed by lancing them out of frustoconical perforated disk 15, openings 25 thusly produced can be formed to have their edges bent outwards. In this way, torque robbing is provided. Torque robbing, as is known to the skilled artisan, is a condition in which the turning energy of the screwdriver, especially a powered screwdriver, is at least partially absorbed to prevent screw 50 from bottoming out, thereby reducing the chances of screw 50 being stripped. The bent edges of opening 25 serve to perform such energy absorbing function by contacting the material on which finishing washer 10 is bearing.

Although the number of tabs 20 utilized in finishing washer 10 is not critical for operability, preferably finishing washer 10 of this inventin has about two to about five, most preferably three, tabs 20 extending inwardly from frustoconical perforated disk 15.

Advantageously, tabs 20 are spaced about equidistantly around the interior of finishing washer 10. For instance, if three tabs are present, they should each be about 120° apart around the interior of finishing washer 10.

There is not cirticality as to the type of screw with which finishing washer 10 of this invention may be used but, advantageously, it is a flat-headed, or substantially flat-headed screw 50, as illustrated in FIG. 5. By flat-headed screw it is meant that the screw should have a head which has a frusto-conical shape to generally correspond to the central shape of finishing washer 10. Generally, a screw assembly is formed by applying finishing washer 10 to screw 50 and then rolling threads 56 onto screw 50 by conventional means, thereby causing finishing washer 10 to be captured between the uppermost threads 56 and head 52 of screw 50. The resulting screw assembly can then be heat-treated by conventional means.

In use, tabs 20 extending inwardly from frustoconical perforated disk 15 function to allow finishing washer 10 to spin freely, i.e., independently of screw 50, when disposed on screw 50. In prior art finishing washers not having tabs, the washer was often prevented from spinning freely by friction between the head of the screw and the interior surface of the washer, which, when greater than friction between the washer and the material the washer was bearing on, caused the washer to spin with the head of the screw. It is the free spinning provided by finishing washer 10 of the present invention which allows finishing washer 10 to prevent damage to the material it is bearing on which would ordinarily be caused by friction or pressure when the screw is tightened.

Another advantage of tabs 20 in allowing finishing washer 10 of this invention to spin freely occurs when an adhesive substance "glues" finishing washer 10 to head 52 of screw 50. For instance when paint is applied, the paint tends to glue the washer to the head of the screw which prevents it from spinning freely. Tabs 20 hold finishing washer 10 away from screw head 52, thereby preventing the paint or other adhesive substance from gluing finishing washer 10 to head 52. Further, because tabs 20 hold finishing washer 10 away from screw head 52, when screw 50 is tightened any sticking paint is effectively broken loose, allowing finishing washer 10 to spin freely.

Tabs 20 extending inward from frustoconical perforated disk 15 also reduce the possibility of stripping of screw 50 by preventing the sudden shock which normally occurs as screw 50 bottoms out, i.e., is completely screwed in. This is accomplished because, when screw 50 bottoms out, tabs 20 are forced back into openings 25 out of which they were lanced. The pressure required to force tabs 20 back into openings 25 absorbs much of the shock of screw 50 bottoming out. Additionally, if the screw assembly (screw 50 and finishing washer 10) is painted, paint webs between finishing water 10 and head 52 of screw 50 will be flattened out along with tabs 20 when screw 50 bottoms out, acting to absorb more of the shock to reduce the possibility of stripping.

While a preferred embodiment of the present invention has been described above and illustrated in the accompanying drawings, it is understood that other embodiments are within the contemplation of the inventor and his invention is not limited to the embodiments shown.

I claim:

1. A screw assembly comprising a threaded screw and a finishing washer disposed between the uppermost threads of said screw and a frustoconical head of said screw, said finishing washer comprising a frustoconical perforated disk having a continuous horizontally oriented upper edge and a plurality of tabs extending inwardly only from said disk, said tabs defining openings in the side of said disk, wherein said tabs are shaped such that the internal sides of said frustoconical perforated disk are not contacted by the head of said screw.

2. The screw assembly of claim 1 wherein said finishing washer comprises about two to about five tabs.

3. The screw assembly of claim 2 wherein said finishing washer comprises three tabs.

4. The screw assembly of claim 1 wherein said finishing washer further comprises a lower edge having a substantially vertical orientation.

5. The screw assembly of claim 1 wherein said finishing washer is comprised of steel.

6. The screw assembly of claim 5 wherein said finishing washer is plated with copper.

7. The screw assembly of claim 1 wherein said tabs are formed by lancing said tabs out of said frustoconical perforated disk.

8. The screw assembly of claim 7 wherein the openings formed when said tabs are lanced out of said frustoconical perforated disk have edges which are bent outwards.

9. A screw assembly comprising a threaded screw having a substantially frustoconical head and a finishing washer disposed between the uppermost threads of said screw and the head of said screw, said finishing washer comprising a frustoconical perforated disk having a substantially continuous horizontal upper edge and a substantially vertical lower edge, said finishing washer further comprising about two to about five tabs extending inwardly only from said frustoconical perforated disk, said tabs defining openings in the side of said disk, wherein said tabs are shaped such that the internal sides of said frutoconical perforated disk are not contacted by the head of said screw.

* * * * *